Patented Jan. 4, 1938

2,104,070

UNITED STATES PATENT OFFICE 2,104,070

STABILIZATION OF ANIMAL AND VEGETABLE FATS AND OILS

Hamilton Bradshaw, Wilmington, Del., assignor to E. I. du Pont de Nemours & Company, Wilmington, Del., a corporation of Delaware No Drawing. Application November 6, 1935, Serial No. 48,497

19 Claims. (Cl. 87—12)

This invention relates to the stabilization of animal and vegetable fats and oils and, more particularly to the inhibition of the development of rancidity therein.

Many compounds are known which will prevent the development of rancidity in animal and vegetable fats and oils but practically all of them are unsuitable because they are either toxic, and therefore cannot be used for stabilizing the edible oils and fats or impart a bad odor and taste to such fats and oils. Some of these compounds are so volatile that they are removed from the fats and oils during cooking or in deep-fat frying operations while others are relatively insoluble in the fats and oils.

An object of the present invention is to provide a new class of stabilizers for animal and vegetable fats and oils which will inhibit or retard deterioration by development of rancidity in such fats and oils. A further object is to provide stabilizers which are suitable for edible fats and oils. Other objects are to stabilize animal and vegetable fats and oils and particularly the edible fats and oils. Still further objects are to provide new compositions of matter and to advance the art. Other objects will appear hereinafter.

These objects may be accomplished in accordance with my invention which comprises incorporating in animal and vegetable fats and oils normally tending to become rancid a small amount sufficient to inhibit rancidity development therein of a phenol having at least one alkoxy group in at least one of the positions ortho and para to a phenolic hydroxyl group and at least one carboxyl group directly bonded to a carbon atom of the aromatic ring, said phenol consisting of carbon, hydrogen and oxygen. These phenols may contain a plurality of carboxyl, hydroxyl, alkoxy, or aliphatic groups besides those above specified.

By the term "carboxyl group", I mean a radicle having the formula:

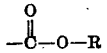

in which R is hydrogen, or a carbon atom of an organic group. Thus, I intend to include the free acids and their esters. By the phrase, "said phenol consisting of carbon, hydrogen and oxygen", I mean that the complete compound consists of carbon hydrogen and oxygen, and is devoid of other elements.

While the broad class of compounds mentioned hereinbefore will, in general, be effective for my purposes, I prefer the mononuclear phenols although the polynuclear phenols, and particularly those of the naphthalene and diphenyl series, may also be employed. Also the esters, particularly the alkyl esters, will be found to be the most satisfactory as they are more efficient stabilizers, are more soluble in the oils and less soluble in water and have other advantages. Amongst the compounds which I have found to be particularly satisfactory for my purpose are syringic acid, methyl syringate and vanillic acid.

The oils and fats which I propose to stabilize are animal and vegetable in origin and are glycerides of the more or less unsaturated higher fatty acids mixed, of course, with some saturated glycerides. Amongst the fats and oils which may be stabilized are linseed oil, China-wood oil, cod liver oil, or the highly unsaturated glycerides which, for the most part, compose them. In general, this invention is particularly directed to the stabilization of those fats and oils which have iodine numbers below 120, examples of which are castor oil, olive oil, rapeseed oil, coconut oil, palm oil, corn oil, sesame oil, peanut oil, neat's-foot oil, butter fat, lard, beef tallow, and hydrogenated oils and fats such as are sold under the trade names of "Crisco" and "Snowdrift". I do not wish to be limited to the use of my compounds in the raw oils and fats, since for certain uses, the oil or fat may be previously subjected to various treatments, such as blowing with air at more or less elevated temperatures or to simple heat-treatments. My compounds and the edible oils and fats containing them can furthermore be used as ingredients in the preparation of pastries and other bakery products, potato chips, mayonnaise, salad oils, and the like. They may be used alone or in combination with other materials as textile dressings, lubricants and the like. However, my compounds are particularly adapted for use in edible and medicinal oils and fats and in food products in which such oils and fats are ingredients.

The concentration in which my agents may be used will vary with the kind of oil or fat to be stabilized, the degree of stabilization desired, the particular agent and other considerations depending upon the desire of the user. The compounds will, in general, be used in concentrations of from about 0.001% to about 1.0% based on the oil or fat to be stabilized.

In order to more clearly illustrate my invention, the preferred modes of carrying the same into effect and the advantageous results to be obtained thereby, the following examples are given:

Example 1

A portion of refined cottonseed oil was divided into two parts: One was retained as a blank or control and to the other was added one per cent of syringic acid. Pieces of filter paper of standard size and type were saturated with the two portions of oil, blotted to remove excess oil, stored in stoppered bottles at 65° C., and (in duplicate experiments) at room temperature, and examined daily for rancid odor, discoloration, etc. Results were as follows:

| Agent (1% concentration) | Discoloration | Days for rancidity to develop | |
| --- | --- | --- | --- |
| | | 65° C. | Room temp. |
| None (untreated oil) | None | 1 | 13 |
| Syringic acid | None | 3 | 27 |

Example 2

Refined cottonseed oil containing 1% of methyl syringate was tested for rancidity development as in Example 1. Results were as follows:

| Agent (1% concentration) | Discoloration | Days for rancidity to develop | |
| --- | --- | --- | --- |
| | | 65° C. | Room temp. |
| None (untreated oil) | None | 1 | 13 |
| Methyl syringate | None | 7 | 41 |

Methyl vanillate or any of the other agents of our class may be substituted for methyl syringate in the above example, or in the other examples.

Example 3

One per cent of methyl syringate was added to melted lard by stirring and the treated lard, together with an untreated portion of the same lot of lard, was heated with frequent stirring for one hour at 200° C. in air. Potato chips were fried under the same conditions in the untreated lard and the treated lard, the excess lard drained off, the chips stored in stoppered bottles at 65° C., and examined daily for rancidity development. The lard was then heated eleven hours longer under the same conditions, then another series of potato chips fried in it and tested in the same manner. The results were as follows:

| Agent (1% concentration) | Days for rancidity development of potato chips fried after lard was heated for number of hours indicated. | |
| --- | --- | --- |
| | 1 hour | 12 hours |
| None (untreated lard) | 4 | 15 |
| Methyl syringate | 33 | 21 |

These results indicate that the stabilizer continues to function even on prolonged heating in oil, indicating that cooking will not destroy its effectiveness. Many stabilizers are destroyed by cooking.

Example 4

Blown cottonseed oil containing one per cent of methyl syringate was tested for rancidity development as in Example 1 above. No discoloration, odor, or taste was imparted to the oil by the methyl syringate, while similar tests made with oil containing one percent catechol, for example, showed bad discoloration three days after the experiments were started. After 33 days the methyl syringate-treated oil was apparently as fresh as when the tests were begun, while oil containing no antioxidant was rancid after one day.

In place of the specific compounds mentioned in the examples, I may employ any of the following compounds:

The ethyl and higher analogs of both syringic and vanillic acid
2,3-dihydroxy-4-methoxybenzoic acid
3,4-dihydroxy-5-methoxybenzoic acid
3,5-dihydroxy-4-methoxybenzoic acid
3,5-dihydroxy-4-methoxybenzoic acid methyl ester
3-hydroxy-4,5-dimethoxybenzoic acid
Isovanillic acid
2-hydroxy-3,4-dimethoxybenzoic acid
3-lauroxy salicylic acid
Vanillyl syringate
4-hydroxy 3,5-dilauroxy benzoic acid
Methyl vanillate, and the higher alkyl esters of the above acids.

Any of the other stabilizing agents covered by my broad disclosure may be employed in place of the agents disclosed in the examples. Mixtures of two or more of my agents may also be employed. Also, my agents may be employed in any of the oils or fats hereinbefore mentioned or in mixtures of such oils and fats or compositions containing them.

It is a characteristic of the compounds covered by this invention that they cause little or no discoloration or objectionable odor or taste of the animal and vegetable fats and oils. This feature of my compounds is especially important with respect to the edible fats and oils because objectionable taste, odor or color cannot be tolerated in foods. Another advantageous feature of my compounds, especially those having long chains in the alkoxy group or in ester groups, is their low volatility, whereby they have little tendency to volatilize during the heating of the oils or fats in cooking or in deep-fat frying operations. A third distinct advantage of my preferred compounds is that they are, for the most part, substantially insoluble in water but soluble in the oils or fats which I wish to stabilize, so that they will not be removed from such oils and fats in cooking operations in which they come into more or less contact with water. Furthermore, their stabilizing properties are not destroyed by heat in cooking and deep-fat frying operations.

While I have disclosed the preferred embodiments of my invention and the preferred modes of carrying the same into effect, it will be readily apparent to those skilled in the art that many variations and changes may be made therein without departing from the spirit of my invention. Accordingly, the scope of my invention is to be limited solely by the appended claims construed as broadly as is permissible in view of the prior art.

I claim:

1. Animal and vegetable fats and oils normally tending to become rancid having incorporated therein, in an amount sufficient to inhibit rancidity development, a phenol having at least one alkoxy group in at least one of the positions ortho and para to a phenolic hydroxyl group and at least one carboxyl group directly bonded to a carbon of the aromatic ring, said phenol consisting of carbon, hydrogen and oxygen.

2. Animal and vegetable fats and oils normally tending to become rancid having incorporated therein, in an amount sufficient to inhibit rancidity development, a mononuclear phenol having at least one alkoxy group in at least one of the positions ortho and para to a phenolic hydroxyl group and at least one carboxyl group directly bonded to a carbon of the benzene ring, said phenol consisting of carbon, hydrogen and oxygen.

3. Animal and vegetable fats and oils normally tending to become rancid having incorporated therein, in an amount sufficient to inhibit rancidity development, a mono-hydroxy benzoic acid having at least one alkoxy group in at least one of the positions ortho and para to the phenolic hydroxyl group, which acid consists of carbon, hydrogen and oxygen.

4. Animal and vegetable fats and oils normally tending to become rancid having incorporated therein, in an amount sufficient to inhibit rancidity development, a p-hydroxy benzoic acid having at least one alkoxy group in at least one of the positions ortho to the phenolic hydroxyl group, said acid consisting of carbon, hydrogen and oxygen.

5. Animal and vegetable fats and oils normally tending to become rancid having incorporated therein, in an amount sufficient to inhibit rancidity devolopment, mono-hydroxy benzoic acid having at least one methoxy group in at least one of the positions ortho and para to the phenolic hydroxyl group.

6. Animal and vegetable fats and oils normally tending to become rancid having incorporated therein, in an amount sufficient to inhibit rancidity development, p-hydroxy benzoic acid having at least one methoxy group in at least one of the positions ortho to the phenolic hydroxyl group.

7. Animal and vegetable fats and oils normally tending to become rancid having incorporated therein, in an amount sufficient to inhibit rancidity development, an ester of a hydroxy benzoic acid having at least one alkoxy group in at least one of the positions ortho and para to a phenolic hydroxyl group, which ester consists of carbon, hydrogen and oxygen.

8. Animal and vegetable fats and oils normally tending to become rancid having incorporated therein, in an amount sufficient to inhibit rancidity development, an alkyl ester of a hydroxy benzoic acid having at least one alkoxy group in at least one of the positions ortho and para to a phenolic hydroxyl group, which ester consists of carbon, hydrogen and oxygen.

9. Animal and vegetable fats and oils normally tending to become rancid having incorporated therein, in an amount sufficient to inhibit rancidity development, an alkyl ester of a mono-hydroxy benzoic acid having at least one alkoxy group in at least one of the positions ortho and para to the phenolic hydroxyl group, which ester consists of carbon, hydrogen and oxygen.

10. Animal and vegetable fats and oils normally tending to become rancid having incorporated therein, in an amount sufficient to inhibit rancidity development, an alkyl ester of a p-hydroxy benzoic acid having at least one alkoxy group in at least one of the positions ortho and para to a phenolic hydroxyl group, which ester consists of carbon, hydrogen and oxygen.

11. Animal and vegetable fats and oils normally tending to become rancid having incorporated therein, in an amount sufficient to inhibit rancidity development, an alkyl ester of p-hydroxy benzoic acid having at least one alkoxy group in at least one of the positions ortho to the phenolic hydroxyl group, said acid consisting of carbon, hydrogen and oxygen.

12. Animal and vegetable fats and oils normally tending to become rancid having incorporated therein, in an amount sufficient to inhibit rancidity development, an alkyl ester of p-hydroxy benzoic acid having at least one methoxy group in at least one of the positions ortho to the phenolic hydroxyl group.

13. Animal and vegetable fats and oils normally tending to become rancid having incorporated therein, in an amount sufficient to inhibit rancidity development, an alkyl ester of syringic acid.

14. Animal and vegetable fats and oils normally tending to become rancid having incorporated therein, in an amount sufficient to inhibit rancidity development, methyl syringate.

15. Edible animal and vegetable fats and oils normally tending to become rancid having incorporated therein, in an amount sufficient to inhibit rancidity development, a phenol having at least one alkoxy group in at least one of the positions ortho and para to a phenolic hydroxyl group and at least one carboxyl group directly bonded to a carbon of the aromatic ring, said phenol consisting of carbon, hydrogen and oxygen.

16. The method of retarding the development of rancidity in animal and vegetable fats and oils and compositions containing them which comprises incorporating therein, in an amount sufficient to inhibit rancidity development, a phenol having at least one alkoxy group in at least one of the positions ortho and para to a phenolic hydroxyl group and at least one carboxyl group directly bonded to a carbon of the aromatic ring, said phenol consisting of carbon, hydrogen and oxygen.

17. Animal and vegetable fats and oils normally tending to become rancid having incorporated therein, in an amount sufficient to inhibit rancidity development, syringic acid.

18. Animal and vegetable fats and oils normally tending to become rancid having incorporated therein, in an amount sufficient to inhibit rancidity development, an alkyl ester of the ethyl analog of syringic acid.

19. Animal and vegetable fats and oils normally tending to become rancid having incorporated therein, in an amount sufficient to inhibit rancidity development, the methyl ester of the ethyl analog of syringic acid.

HAMILTON BRADSHAW.